United States Patent Office.

SAMUEL BOTHWELL, OF PHILADELPHIA, PENNSYLVANIA, ASSIGNOR TO HIMSELF AND RALPH ORMROD, OF SAME PLACE.

Letters Patent No. 103,418, dated May 24, 1870.

IMPROVED WELDING-POWDER FOR IRON AND STEEL.

The Schedule referred to in these Letters Patent and making part of the same.

I, SAMUEL BOTHWELL, of Philadelphia, county of Philadelphia, State of Pennsylvania, have invented an Improved Welding-Powder, of which the following is a specification.

My invention consists of a welding-powder composed of soda-ash (either common or refined) and chloride of lime; these ingredients I prefer to combine in about the proportion of two-thirds of the former to one-third of the latter, but these proportions may be varied according to the quality of the metal to be welded.

For welding refined cast-steel, a combination of high grade soda-ash and chloride of lime has been found most effectual; but for welding ordinary scrap-steel, a mixture of crude soda-ash with the chloride of lime will answer every purpose.

The method of using the powder in welding scrap-steel is as follows:

The scraps are piled upon a board, as is usual with iron, and are placed in a furnace and submitted to a gradually increasing heat.

As soon as the the mass begins to melt, and while yet in the furnace, a quantity of the powder, say several handfuls is thrown upon the same. This will have the effect of causing a thorough union and welding together of the scraps, either in the furnace or during the subsequent operations of squeezing, hammering, &c.

If it be found necessary, an additional quantity of the powder can be thrown upon the mass after it is removed from the furnace, and while under the hammer.

For welding two pieces of metal together, such as a collar onto a shaft, the shaft should be heated first, withdrawn from the furnace and the collar put on cold, with a small quantity of the powder between the same and the shaft. Both collar and shaft should then be put into the furnace, and allowed to remain there until they begin to melt, when an additional quantity of the powder should be thrown upon the same to complete the welding.

In welding some kinds of steel, a small quantity of resin may be used with the powder, for the purpose of improving the quality of the metal, but this is not essential.

My improved powder, besides effecting a perfect welding of the metal to which it is applied, has the additional advantages of being easy of application, (as it may be thrown onto the metal by the handful,) of being perfectly harmless to the workmen, and much more economical both in quantity required and in price, than other welding powders or liquids.

Claim.

A welding-powder composed of soda-ash and chloride of lime, as described.

In testimony whereof I have signed my name to this specification in the presence of two subscribing witnesses.

SAMUEL BOTHWELL.

Witnesses:
 HARRY SMITH,
 F. B. RICHARDS.